UNITED STATES PATENT OFFICE.

ERICH SPRINGBORN, OF LONDON, ENGLAND.

MANUFACTURE OF ARTIFICIAL FUEL.

SPECIFICATION forming part of Letters Patent No. 690,888, dated January 7, 1902.

Application filed June 30, 1900. Serial No. 22,208. (No specimens.)

*To all whom it may concern:*

Be it known that I, ERICH SPRINGBORN, chemist, a subject of the Emperor of Germany, residing at 137 Fenchurch street, in the city of London, England, have invented certain new and useful Improvements Relating to the Manufacture of Artificial Fuel, of which the following is a specification.

This invention has for its object to produce a combustible material of good quality from solid or semisolid substances—such as sewage or other refuse matter, earths or rocks of a non-metallic or carbonaceous nature, such as marl, dolomite, basalt, certain clays containing a low percentage of silicate, and also those containing bituminous substance, the silt of rivers or lakes containing vegetable or bituminous matter, and other earths of vegetable origin.

A further object of my invention is to treat such substances in the solid state without pulverizing or breaking them up. In the treatment of substances of great density, however, I sometimes find it necessary to crush or pulverize the same.

My invention is also applicable to the treatment of low-class natural fuel for the purpose of improving its value or efficiency.

According to my invention I immerse the said solid substances in an aqueous solution of sugar, the strength of which varies according to the quantity of calcium or calcium compounds and of silicates present in the substance. For general purposes, as in the treatment of the aforesaid river-silt, I use a solution of about the following proportions: water, one hundred pounds, and sugar, four to sixteen ounces. After the substance has been immersed in this solution for a period of from one to three hours, during which it is maintained at a temperature of from 30° centigrade to 100° centigrade, the time and temperature depending upon the density of the substance and also upon the quantity of calcium compounds and silicates therein, I draw off the solution or remove the substance therefrom. I then immerse the substance in a liquor consisting, mainly, of coal-tar, to which I prefer to add a certain quantity of petroleum and also a small quantity of tallow for the purpose of retarding the volatilization of hydrogen and hydrocarbons. In some cases I may dispense with the petroleum, or I may employ heavy petroleum and tallow and no coal-tar. Instead of the tar or petroleum I may employ any other oils. I may replace the tallow or some of it with paraffin or other wax or with resin. I add to this liquor a short time after the substance has been immersed therein a small quantity of sodium chlorid or sodium bicarbonate or potassium nitrate dissolved in water; but this is not necessary if the substance itself contains sodium chlorid. The substance is maintained in this liquor for a period of from two to three hours at a temperature of from 25° centigrade to 40° centigrade, according to the density of said substance and the compounds or elements forming the constituents thereof. The liquor is then drawn off, or the substance is removed therefrom and allowed to dry, when it is ready for use as fuel.

Some of the substances above indicated are of such a nature as to be partly or even wholly disintegrated by the solutions or liquor, and in such cases I employ for effecting the immersing of such substance a vat or receptacle having a false bottom consisting of a sieve or grating that will allow very fine particles to pass through, but will support practically the whole of the substance in the form of lumps or particles of various sizes. The fine particles and, if desired, also the lumps of material can afterward be molded or pressed into briquets.

In treating low-class fuel, such as coal containing carbonaceous and calcium compounds, which coal when burned alone would yield a large amount of ash, I crush or pulverize the same to a greater or less degree of fineness, according to its density, and then subject it to the above-described treatment.

In dealing with pulverized or other substances in a finely-divided state I sometimes increase the amount of tar and decrease or dispense with that of the petroleum. With pulverized substances that contain very little carbon I sometimes mix from one to three per cent., by weight, of graphite before immersing the same in the sugar solution.

When treating semisolid substances or substances containing water, I may mix dry sugar therewith, if there be sufficient water to dissolve the same, or I may treat said substance with a sugar solution of greater strength than that above mentioned.

What I claim, and desire to secure by Letters Patent of the United States, is—

1. The method of treating carbonaceous substance for the production of fuel, consisting in first impregnating such substance with sugar, then immersing it in hydrocarbon liquor, then adding to said liquor while the substance is immersed therein a solution of alkali, and finally allowing it to dry, substantially as described.

2. The method of treating carbonaceous substance for the production of fuel, consisting in impregnating the substance with sugar, then immersing it in hydrocarbon liquor, then adding to said liquor while the substance is immersed therein a solution of alkali, then allowing it to dry, and then compressing it, substantially as described.

3. The method of treating carbonaceous substance for the production of fuel, consisting in impregnating such substance with sugar, then immersing it in bituminous liquor, then adding to said liquor while the substance is immersed therein a solution of alkali, and then allowing it to dry, substantially as described.

4. The method of treating carbonaceous substance for the production of fuel, consisting in impregnating such substance with sugar, then immersing it in a solution of coal-tar, petroleum and resin, then adding alkali to the said solution, and then allowing the substance to dry, substantially as described.

5. Solid fuel consisting of carbonaceous substance, sugar, coal-tar, petroleum, resin and alkali, substantially as described.

In testimony whereof I have hereunto set my hand, in presence of two subscribing witnesses, this 15th day of June, 1900.

ERICH SPRINGBORN.

Witnesses:
F. J. SHERRINGTON,
WALTER J. SKERTEN.